United States Patent [19]

Kakuwa

[11] Patent Number: 5,075,144

[45] Date of Patent: Dec. 24, 1991

[54] NON-SLIP MATERIAL AND METHOD OF MAKING THE SAME

[76] Inventor: Kahei Kakuwa, 3-18-14 Akatutumi, Setagaya-Ku, Tokyo, Japan

[21] Appl. No.: 499,842

[22] Filed: Mar. 27, 1990

[51] Int. Cl.5 .................. A41D 19/00; B32B 5/08; B32B 31/12; B32B 33/00
[52] U.S. Cl. ............................. 428/40; 2/161 A; 156/280; 428/247; 428/354
[58] Field of Search .............. 2/161 A; 428/40, 247, 428/354; 156/280

[56] References Cited

U.S. PATENT DOCUMENTS

| | | | |
|---|---|---|---|
| Re. 25,675 | 11/1964 | Du Bonnett | 428/40 |
| 1,960,137 | 5/1934 | Brown | 428/40 |
| 2,057,873 | 10/1936 | Atwood | 428/40 |
| 2,864,091 | 12/1958 | Schneider | 2/161 |
| 3,578,550 | 5/1971 | Hoerner | 428/40 |
| 4,172,293 | 10/1979 | Vistins | 2/161 |
| 4,397,905 | 8/1983 | Dettmer et al. | 428/40 |
| 4,567,091 | 1/1986 | Spector | 428/40 |
| 4,696,842 | 9/1987 | Doubt | 428/40 |
| 4,921,739 | 5/1990 | Cascino | 428/40 |
| 4,931,330 | 6/1990 | Stier et al. | 428/40 |

Primary Examiner—James C. Cannon
Attorney, Agent, or Firm—Armstrong, Nikaido, Marmelstein, Kubovcik & Murray

[57] ABSTRACT

A non-slip material including a basic cloth layer, an adhesive layer on a back surface of the basic cloth layer, a detachable paper sheet attached over the adhesive layer until use, a net attached to the opposite surface of the basic cloth layer, and a resin coating layer formed on the net so as to cover the surface of the net and the basic cloth layer. A method of making a non-slip material includes forming of an adhesive layer on the back of a basic cloth layer, attaching a detachable paper sheet to the adhesive layer, bonding a net on the opposite surface of the basic cloth layer, and forming a resin coating layer on the surface of the net and the basic cloth layer to which the net has been bonded.

2 Claims, 1 Drawing Sheet

NON-SLIP MATERIAL AND METHOD OF MAKING THE SAME

BACKGROUND OF THE INVENTION

This invention is concerned with a non-slip material and a method of making the same. In particular, this non-slip material with a clear-cut uneven surface can be formed without the use of a metal mold.

In the case of making a non-slip material for use on items such as straps and handles, in the past, a metal mold was necessary with synthetic rubber etc, to form the unevenness which had the non-slip function.

Since there was no way known in the past to form the unevenness other than by using a metal mold, there was the problem that the cost of the metal mold would be considerably high on a low priced commodity such as when forming thin non-slip material of a size of about 6 cm$^2$ is involved.

SUMMARY OF THE INVENTION

In the light of such a fact, this invention was developed presenting the method of preparing a non-slip material in which a non-slip material with large unevenness can be easily formed, without using a metal mold.

The following technical measures were conceived in this invention to solve the foregoing problem and to attain the above object.

The non-slip material includes a basic cloth layer, an adhesive layer formed on the back of the basic cloth layer, a detachable paper sheet attached over the adhesive layer until use, a net bonded on the opposite surface of the basic cloth layer, and a resin coating layer formed to cover the surface of the net and basic cloth layer.

The method of making the non-slip material comprises forming an adhesive layer on the back of a basic cloth layer, attaching a detachable paper sheet over the adhesive layer, binding a net onto the opposite surface of the basic cloth layer, and forming a resin coating layer on the surface of the bonded net and the basic cloth layer to which the net has been bonded.

The basic cloth layer can be of woven fabric, knitted fabric, resin sheet such as vinyl sheeting, and the like. A padded material can be coated with thin resin sheet. When the net is bonded on the surface of the basic cloth layer, the surface of the basic cloth becomes uneven by the thickness of the thread of the net. The net to be used can be made up of Rassel lace of thick synthetic fiber thread with tortoise shell pattern or checkered pattern or fine eyes of fish net pattern. When the resin coating layer such as a rubber coating is formed on the surface of the net and onto the surface of the basic cloth layer, the net is firmly set on the basic cloth layer and will be protected. In this way, unevenness can easily be formed on the surface of the basic cloth. This non-slip material used on a golf glove will prevent slipping at the time of swinging of the golf club. It is easily installed on the glove by cutting a piece of the non-slip material to the size of about 6 cm$^2$, striping off the detachable paper sheet, and sticking the material on the glove used for golfing at the desired location.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENT

Figure 1:
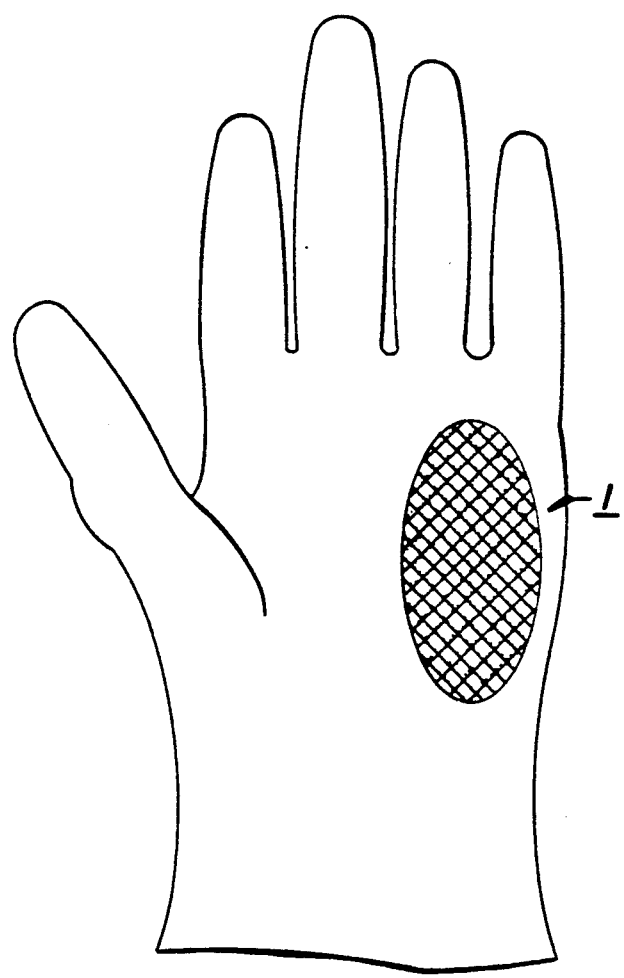
FIG. 1 is a cross-sectional view of the non-slip material according to the present invention.

The practical application of this invention is explained based on the drawings. In FIG.1, a sample cross section of the non-slip material 1 according to the present invention is shown. It includes a basic cloth layer 2 (for example, 0.2 mm thick vinyl sheet), an adhesive layer 3 on the back of the basic cloth 2, a detachable paper sheet 4 on the adhesive layer 3, a layer of a binding agent 5 on the opposite side of the basic cloth layer 2, a net 6 applied on the layer of binding agent 5, and a top resin coating layer 7 applied over the net and the surface of the binding agent not covered by the net.

The net 6 can be made up of 3 mm spaced Rassel lace (tetron fabric) which is bonded on the surface of the basic cloth 2 by the binding agent 5. Any suitable binding agent can be used. The resin coating layer 7 comprised of, for example, a rubber coating, is formed on the surface of the net 6 and covering the surface of the basic cloth 2.

Figure 2:
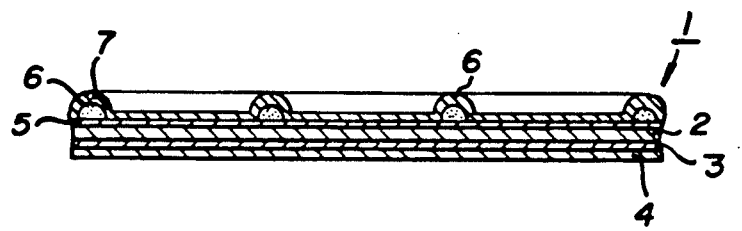
FIG. 2 shows a front view of the non-slip material as applied to a glove for golfing.

In use, a sheet of the non-slip material 1 can be cut in into a piece having an oval shape having a size of 7 cm in length and 4 cm in breadth. The detachable paper sheet 4 is then stripped off. This piece of non-slip material 1 is then stuck at the desired location onto a glove used for golfing as shown on FIG. 2.

This glove will prevent slipping enabling a nice shot.

This non-slip material has a wide scope of application. For instance, by applying this material to the sole of socks for infants, it can help prevent the infant from slipping and falling on bare floors, for example, in the hallway. The non-slip material is extremely flexible and can be applied to the rounded section of steering wheels to improve a driver's grip.

The touch is soft as non-slip material for staircases.

As in the case of manufacturing well known adhesive tapes, the adhesive layer is applied on the back of the basic cloth layer by a roller followed by the application of the detachable paper sheet by another roller. Binding agent is then applied to the other surface of the basic cloth layer followed by the application of the net by the roller. The resin coating layer is applied onto the net and the surface of the basic cloth layer followed by drying and curing.

This invention excels as following:

(1) Non-slip material with large unevenness can be easily made without using a metal mold.

(2) The non-slip material can be applied and used on any object as the adhesive layer has been formed on the back of the basic cloth.

(3) The non-slip material can be naturally applied to leather, knitted goods, and textile clothing because this non-slip material is very flexible and strong on frictions.

(4) The non-slip material can be sold at inexpensive prices as the cost of manufacture is low.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A non-slip material comprising a basic cloth layer, an adhesive layer on a back surface of the basic cloth layer, a detachable paper sheet attached over the adhesive layer until use, a net attached to the opposite surface of the basic cloth layer, and a resin coating layer formed on the net so as to cover the surface of the net and the basic cloth layer.

2. A method of making a non-slip material comprising: forming of an adhesive layer on the back of a basic cloth layer, attaching a detachable paper sheet to the adhesive layer, bonding a net on the opposite surface of the basic cloth layer, and forming a resin coating layer on the surface of the net and the basic cloth layer to which the net has been bonded.

* * * * *

UNITED STATES PATENT AND TRADEMARK OFFICE
CERTIFICATE OF CORRECTION

PATENT NO. : 5,075,144
DATED : December 24, 1991
INVENTOR(S) : KAKUWA

It is certified that error appears in the above-identified patent and that said Letters Patent is hereby corrected as shown below:

On the cover page, item [30], Foreign Application Priority Data is missing. Please insert --[30] March 27, 1989 [JP] Japan .................... 1-74693.--

Signed and Sealed this

Eighth Day of June, 1993

MICHAEL K. KIRK

*Attest:*

*Attesting Officer*   *Acting Commissioner of Patents and Trademarks*